United States Patent [19]
Lin

[11] Patent Number: 5,207,914
[45] Date of Patent: * May 4, 1993

[54] HIGH PERFORMANCE CHROMATOGRAPHY

[75] Inventor: GwoChung Lin, McCandless Township, Allegheny County, Pa.

[73] Assignee: Alcoa Company of America, Pittsburgh, Pa.

[*] Notice: The portion of the term of this patent subsequent to Apr. 18, 2006 has been disclaimed.

[21] Appl. No.: 745,470

[22] Filed: Aug. 13, 1991

Related U.S. Application Data

[63] Continuation of Ser. No. 294,343, Dec. 28, 1988, abandoned.

[51] Int. Cl.$^5$ .................................................. B01D 15/08
[52] U.S. Cl. ...................................... 210/635; 210/656; 210/198.2; 210/502.1
[58] Field of Search ................ 423/629; 23/305 A; 210/635, 656, 198.2, 502.1, 263

[56] References Cited

U.S. PATENT DOCUMENTS

| | | | |
|---|---|---|---|
| 3,065,185 | 11/1962 | Burns et al. | 252/428 |
| 3,664,967 | 5/1972 | Stehl | 252/431 R |
| 3,984,349 | 10/1976 | Meiller | 210/656 |
| 4,045,353 | 8/1977 | Kosaka et al. | 210/502 |
| 4,159,966 | 7/1979 | Roberts | 252/430 |
| 4,245,005 | 1/1981 | Regnier et al. | 428/420 |
| 4,267,032 | 5/1981 | Burk | 208/113 |
| 4,324,681 | 4/1982 | House | 252/184 |
| 4,517,241 | 5/1985 | Alpert | 428/332 |
| 4,672,042 | 6/1987 | Ross | 210/198.2 |
| 4,673,734 | 6/1987 | Tayot et al. | 530/364 |
| 4,786,628 | 11/1988 | Wieserman et al. | 502/401 |
| 4,788,176 | 11/1988 | Wieserman et al. | 502/401 |
| 4,822,593 | 4/1989 | Wilhelmy | 210/656 |
| 4,900,537 | 2/1990 | Wilhelmy | 423/629 |
| 4,913,935 | 4/1990 | Lin | 427/221 |

FOREIGN PATENT DOCUMENTS

| | | | |
|---|---|---|---|
| 1065733 | 4/1967 | United Kingdom | 423/629 |
| 1107875 | 3/1968 | United Kingdom | 423/629 |

OTHER PUBLICATIONS

Bien-Vogelsang, U. et al, "Syntheses of Stationary Phases for Reversed-Phase LC Using Silanization and Polymer Coating", Max-Planck-Institut, *Chromatographia*, vol. 19, pp. 170–179. Oct. 1984.

Schomburg, G. et al, "Immobilization of Stationary Liquids on Silica Particles by Gamma-Radiation", Max-Planck-Institut, *Chromatographia*, vol. 18, No. 5, 1984, pp. 265–274.

Figge, H. et al, "Stationary Phases for Reversed-Phase Liquid Chromatography, Coating of Silica by Polymers of Various Polarities", *Journal of Chromatography*, 351, 1986, pp. 393–408, (Max-Planck-Institut).

Mikes' Laboratory Handbook of Chromatographic and Allied Methods, John Wiley & Sons, New York, 1979, p. 293.

*Primary Examiner*—Ernest G. Therkorn
*Attorney, Agent, or Firm*—Sheldon H. Parker

[57] ABSTRACT

The invention includes a process for performing high performance liquid chromatography in the reverse phase. The present process for high performance separations by liquid chromatography uses a separations media, including separations packing materials for packed column separations, of polybutadiene coated and crosslinked on a surface of generally spherical metal oxide/hydroxide support particles comprising crystals of metal oxide/hydroxide with the crystals extending radially outward from a central core region and having a shape selected from principally acicular to principally lamellar. It has been found that liquid chromatography using the process of the present invention works particularly well in separating basic, nitrogen-containing compounds.

18 Claims, 1 Drawing Sheet

HIGH PERFORMANCE CHROMATOGRAPHY

This is a continuation of copending application Ser. No. 07/294,343 filed on Dec. 28, 1988, now abandoned.

BACKGROUND OF THE INVENTION

This invention relates to high performance chromatography to provide high performance chemical separations and purifications by reverse phase chromatography.

High performance liquid chromatography today means separations processes for performing liquid chromatography at higher speeds and separation powers not available in classical liquid chromatography. Separation processes are performed in minutes instead of hours or days, and some new column packings provide separations that were previously impossible.

Reverse phase chromatography processes involve adsorption on an adsorbent less polar than the eluting solvent. Contrastingly, normal phase chromatography processes involve an adsorbent more polar than the eluting solvent. In reverse phase chromatography separation processes, the more non-polar sample components interact more with the relatively non-polar column packing and thus elute later than polar sample components.

U.S. Pat. No. 4,045,353 discloses prior art processes for high speed liquid chromatography using an organic compound or organic polymer gel on an inorganic substrate. Suitable polymerizable monomers include the ethylenically unsaturated monomers, e.g., such as styrene monomer, fluorine monomer, silicon-containing monomer, acrylates, methacrylates, vinyl monomer, olefin monomers, diene monomers, e.g., such as butadiene, isoprene, 1,3-pentadiene, cyclopentadiene, chloroprene, or other monomers capable of being radiation polymerized such as the aldehydes, ketones, cyclic ethers, or the like. Such a polymer can be grafted (the patent discloses) on a substrate of "silica, silica gel, alumina, diatomaceous earth, zeolite, porous glass, carbon black, active carbon, clay, etc."

Many processes for high performance liquid chromatography use silica-based reverse phase packings but these materials have problems associated with a relatively narrow operating pH range, e.g., such as about 2-8, and a high pressure drop requirement. The narrow operating pH range of silica materials usually results in a shorter column life, a loss of separations versatility, and difficulty in the cleanup with strong alkali and acid for cost effective, high speed analytical, semi-preparative and preparative purification of samples. The high pressure drop of the silica-based materials also limits the ultimate speed and separation capabilities of the chromatography column.

Aluminas have been used frequently in classical adsorption chromatography, but the use of aluminas as media for modern high performance liquid chromatography in the reverse phase has been less than silica because alumina is not easily converted to a hydrophobic phase for selective chromatographic separation via chemical bonding the surface by various hydrocarbon groups, e.g., alkyl or phenyl. The prior art has found that most silanization reagents used successfully with silica show no reactivity toward aluminas. Although chlorosilanes react with alumina, the formed Al—O—Si—C bond is known to be highly unstable under reverse phase chromatographic conditions.

It is an object of the present invention to provide a process for performing reverse phase chromatography.

It is another object of the present invention to provide a process for performing reverse phase chromatography at a lower pressure drop through the separations column.

It is a further object of the present invention to provide a process for performing reverse phase chromatography at a wid range of pH.

It is yet another object of the present invention to provide a process for performing reverse phase chromatography to separate and purify basic, nitrogen-containing compounds.

These and other objects of the present invention will become apparent from the detailed description which follows.

SUMMARY OF THE INVENTION

The invention includes a process for performing high performance liquid chromatography in the reverse phase. The present process for high performance separations by liquid chromatography uses a separations media, including separations packing materials for packed column separations, of polybutadiene coated and crosslinked on a surface of generally spherical metal oxide/hydroxide support particles comprising crystals of metal oxide/hydroxide with the crystals extending radially outward from a central core region and having a shape selected from principally acicular to principally lamellar. It has been found that liquid chromatography using the process of the present invention works particularly well in separating basic, nitrogen-containing compounds.

BRIEF DESCRIPTION OF THE DRAWING

The sole Figure having parts A-E presents a comparison of chromatographic peaks obtained from commercially available packing materials compared to the material and method of the present invention.

DETAILED DESCRIPTION

Figure 1A:
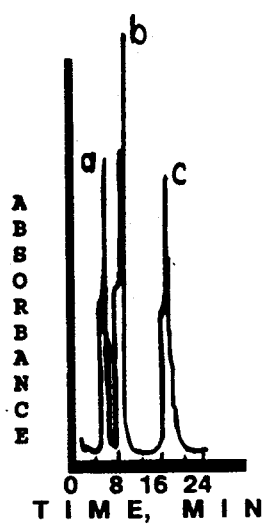
Figure 1B:
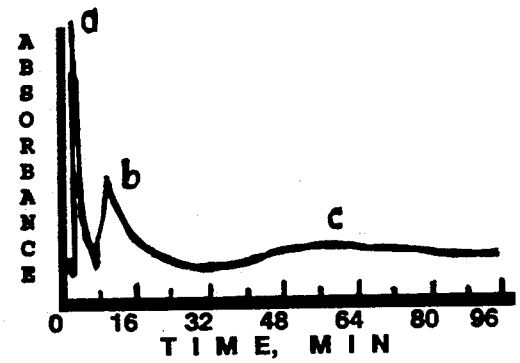
Figure 1C:
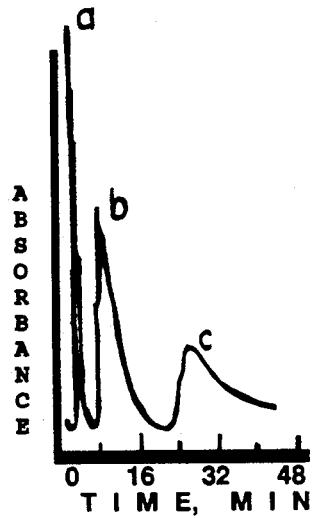
Figure 1D:
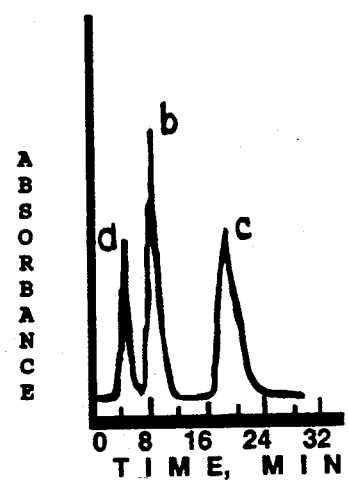
Figure 1E:
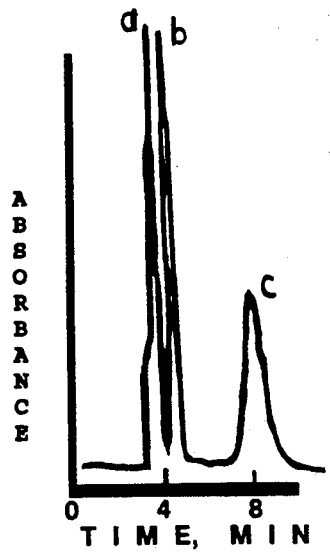

The process of the present invention includes separating a feed stream of a compound by introducing the feed stream into a unique packed bed of particles having stable polybutadiene (PBD) coated and crosslinked on a particular alumina and separating the compound on the unique packed bed for reverse phase high performance liquid chromatography. The process includes separating on a packed bed of polybutadiene on the particular alumina of generally spherical aluminum oxide particles comprised of solid crystals of aluminum oxide with the crystals extending radially outward from a central core region and having a shape selected from principally acicular to principally lamellar. The material of the present invention is synthesized by coating and immobilizing polybutadiene on the particular alumina. The immobilization is achieved by crosslinking with radical reactions, initiated by thermal decomposition of radical starters such as including dicumylperoxide. The packing material of the present invention includes polybutadiene in the amount of 5-20% by weight and preferably 8-10% by weight on the particular alumina in accordance with the present invention. My related co-pending U.S. patent application filed on the same date herewith discloses producing the packing materials used in the process of the present invention and is hereby incorporated by reference.

The chromatographic behavior of this packing material has been tested extensively for efficiency, selectivity, and stability, both in long term stability and chemical stability in comparison with various reverse phase packings. The packing material of the present invention outperforms silica-based reverse phase packings with a lower pressure drop, wider pH stability, and less peak tailing for the separation of basic compounds. Separations for aromatics, anilines, purines, pyrimidines, and nucleosides have been found to provide good resolution with the packing material of the present invention.

The process of the present invention may be operated over a wide pH range, e.g., such as 2-12. The present invention also provides a process which overcomes the problems associated with silica-based processes requiring high pressure drop requirements in packed columns.

The chromatography column can be packed, by way of example, using a 20 ml sample of isopropyl alcohol containing about 2-3 g of particles sonicated for at least coated and crosslinked Wilhelmy alumina. Peak shaped obtained from the polybutadiene coated and crosslinked alumina in accordance with the process of the present invention were superior to those obtained from adamantyl or the commercially available octyl or octadecyl bonded on silica. Superior is determined by a trailing characteristic for each solute evaluated by calculating the asymmetric factor as the ratio of rear part to the front part of the peak at 10% peak height. Calculations of this characteristic factor are presented in Table I. Table I presents asymmetry factors for the packing material of the present invention compared to various prior art reverse phase packing materials including adamantyl bonded on silica, octadecyl bonded on silica, and octyl bonded on silica. The prior art asymmetry factors are taken from published literature. All asymmetry factors were obtained under identical mobile phase composition (50% water/50% methanol) for all the columns.

TABLE I

| Packing | Solutes | | | | | | |
|---|---|---|---|---|---|---|---|
| | aniline | n-methylaniline | n,n-dimethylaniline | p-toluidine | o-toluidine | m-toluidine | p-chloroaniline |
| adamantyl (10 μm) | 2.4 | 2.7 | 3.3 | 4.0 | 2.8 | 3.0 | 1.9 |
| octadecyl (5 μm) | 12.8 | 14.8 | 17.0 | 4.9 | 9.0 | 5.1 | 4.3 |
| octyl (5 μm) | 7.5 | 13.4 | 14.3 | 13.2 | 8.5 | 11.1 | 5.9 |
| octyl (5 μm) | 4.3 | 4.4 | 5.3 | 6.0 | 5.1 | 4.1 | 3.4 |
| octadecyl (5 μm) | 14.2 | 12.9 | 16.2 | 19.6 | 5.2 | 6.9 | 4.1 |
| octyldecyl (5 μm) | 7.9 | 8.1 | 15.2 | 17.4 | 8.4 | 11.7 | 4.1 |
| octadecyl (5 μm) | 10.1 | 11.5 | 13.1 | 9.8 | 5.5 | 3.1 | 3.5 |
| octyl (10 μm) | 11.1 | 11.2 | 13.7 | 5.5 | 9.8 | 7.5 | 7.5 |
| octadecyl (3 μm) | 18.8 | 23.5 | 28.0 | 18.7 | 21.8 | 20.2 | 16.1 |
| PBD coated and crosslinked on Wilhelmy Alumina | 1.1 | 2.0 | 2.3 | 1.5 | 2.2 | 1.9 | 1.6 | about 15 minutes and added to the packing reservoir, the reservoir being connected to the column arranged in downward configuration. Coated particles are forced into the column at 6,000 psi with methanol as a loading solvent. The packing is consolidated until a constant flow rate of methanol reaches equilibrium (approximately 10 minutes). Pressure should be allowed to bleed off the outlet, and the column disconnected from the packer. Excess particles can be scraped from the top face of the column, and a fitting containing a stainless steel frit attached to the column inlet.

Using a reverse phase test mix of small solutes, the effective flow rate on column efficiency of a 15 cm × 4.6 mm column pack with 9% polybutadiene coated Wilhelmy alumina particles can be observed. The number of theoretical plates per meter depends on the flow rate. A narrow peak for a basic solute, e.g., such as theophylline, indicates that the polybutadiene coated particles have been covered fully by the polybutadiene.

Referring to the Figure, chromatograms (from published literature) are depicted for the separation of aniline, n-methylaniline, and n,n-dimethylaniline on various packing materials including adamantyl bonded on silica (A), octadecyl bonded on silica (B), octyl bonded on silica (C), octyl bonded on silica (D) (from a source different from (C)), and (from experimental using a Beckman liquid chromatograph) for polybutadiene

EXAMPLE 1

Two Beckman liquid chromatographs, used in all Examples, were (1) 421 A controller, two 100B solvent delivery modules, a 163 variable wavelength detector, a 25 microliter Altex 210 valve injector, and a Hp 3390 A integrator and (2) a 421 A controller, two 114 solvent delivery modules, a 427 integrator, and a 165 variable wavelength detector with a minicontroller. Polymer coating and crosslinking were done with a rotary evaporator (Rotovapor, Buchi) and a gas chromatographic oven (HP5890A gas chromatograph), respectively. Column packing was performed with a Haskel air driven fluid pump. Polybutadiene (PBD) obtained from Aldrich Chemical Company was phenyl terminated (99% unsaturation, 25% vinyl, 40% trans-1,4, average molecular weight 3400).

The support base media were Alcoa Wilhelmy alumina particles and alcoa S-100 alumina, Whatman Partisil (5 microns, surface area: 350 m$^2$/g), Phase Separation Spherisorb (A-10Y).

Three to fifteen (3-15 g) of Alcoa Wilhelmy particles and other media were suspended in a 250 ml found flask in 100 to 150 ml of n-pentane solutions which contain 10 to 20 percent (weight with respect to particles used) of polybutadiene oligomer and 2 percent of DCP (weight with respect to polybutadiene used). After 30 minutes of sonication, the pentane was slowly evaporated with rotary evaporator which was connected to an aspirator to accelerate the evaporation process. To prevent losing activity of DCP, the evaporation process was carried out at ambient temperature. The PBD coated particles were packed (dry packing) into a stainless steel column and purged with dry nitrogen at a flow rate of about 10 ml/min overnight. The crosslinking was done by raising oven temperature to 170° C. at a rate of 5° C./min and kept for 2 hours. Afterwards, the polymer coated and crosslinked particles were washed with up to 200 ml each of heptane and methylene chloride to get rid of unreacted polybutadiene. Finally, the washed particles were put back into flask and dried with rotary evaporator at least for 4 hours.

For the column packing process, 20 ml of isopropyl alcohol containing 2 to 3 g of particles sonicated for 15 minutes were added to the packing reservoir connected to the column arranged in a downward configuration. Packing particles were suddenly forced into the column at 6,000 psi with methanol as loading solvent. The packing was consolidated until a constant flow rate of methanol was reached (approximately 10 minutes). The pressure was allowed to bleed off the outlet, and the column was disconnected from the packer. Excess particles were carefully scrapped off the top face of the column, and a fitting containing a stainless steel frit was attached to the column inlet.

EXAMPLE 2

Retention-time drift in liquid chromatography can be caused by a number of system changes such as temperature fluctuation, variations in mobile phase composition, flow rate change, and column instability or aging. To study the retention reproducibility and long-term stability (column aging) of polybutadiene coated Alcoa Wilhelmy particles, a reversed phase test mix was analyzed in a 4.6 mm×15 cm column packed with 9 percent polybutadiene coated alcoa Wilhelmy particles. Retention times were measured on ten consecutive isocratic runs with mobile phase composition of 50 percent $H_2O$/50 percent $M_eOH$. The mean retention times recorded were (in minutes) theophilline, 2.005; p-nitroaniline, 2.109; methylbenzoate, 3.108; and phenetole, 5.168. Reproducibility was excellent. Phenetole has a biggest standard deviation in retention among the 4 solutes tested, but only shows a moderate 0.079 standard deviation which corresponds to 1.5 percent over the ten (10) runs. The other standard deviations were theophilline, 0.015; p-nitroaniline, 0.013; and methylbenzoate, 0.021.

Using a reversed phase test mix of small solutes, column efficiency was determined for a 15 cm×4.6 mm column packed with 9 percent PBD coated Wilhelmy particles. The number of theoretical plates per meter depends on the flow rate. The flow rates studied were in the range from 0.5 ml/min up to 3.5 ml/min. The highest column efficiency was obtained at a flow rate of 0.5 ml/min, which corresponds to a column efficiency of 29,000 to 33,000 plates/meter. While at normal LC operating flow rate of 1 ml/min, a reasonably good column efficiency of 20,000 to 24,500 plates/meters was obtained. However, for higher flow rate, the efficiency decreased quickly.

The long-term stability against the attack of mobile phase solvents, such as water and methanol, was excellent. No appreciable change in retention was observed for theophilline, p-nitroaniline, and methylbenzoate, while phenetole shows a decrease of 3.4 percent in retention time.

EXAMPLE 3

Basic compounds have severe peak asymmetry problems for octadecylsilyl bonded silica column. The effect is attributable to the presence of residual, non-silylated, silanol groups on the surface of column packing materials. Some ways to overcome peak trailing problems are end capping the surface silanols by reacting derivatized surfaces with a smaller molecule silanizing reagent, such as trimethylchlorosilane, mobile phase additives to reduce the concentration of accessible silanols by strongly sorbing to the surface, and steric exclusion of the solutes from reaching the surface of column material. Although improvements in peak symmetry have been obtained, these approaches do not provide a total solution to the tailing problems. To test the performance of polybutadiene coated Alcoa Wilhelmy particles, aniline, n-methylaniline, n,n-dimethylaniline, o-toluidine, m-toluidine, p-toluidine, and p-chloroaniline were used. The Figure illustrates chromatograms obtained from adamantyl (A), octadecyl (B), octyl (C), octyl (D) (from a source different from (C), and polybutadiene coated Alcoa Wilhelmy particles for the separation of aniline, n-methylaniline, and n,n-dimethylaniline. The peak shapes obtained from the polybutadiene coated Alcoa Wilhelmy particles in the packed column were superior to those obtained from either adamantyl or the commercially available octyl or octadecyl phases. The tailing characteristic for each solute was evaluated by calculating the asymmetric factor as the ratio of rear part to the front part of peak at 10 percent peak height. Results from this calculation are listed in Table I hereinabove. Columns were either made (adamantyl) or tested of commercial columns (including IBM octadecyl, IBM octyl, Altex Ultrasphere octyl, Alter Ultrasphere octadecyl, Supelco octadecyl, octyl, Hibar octyl, Perkin-Elmer octadecyl phases). All the asymmetry factors obtained were under identical mobile phase composition (50 percent $H_2O$/50 percent $M_eOH$) for all the columns. It appears that asymmetry factors obtained from alumina-based reversed phases are much smaller for polybutadiene Alcoa Wilhelmy alumina than those obtained from adamantyl column or any commercial column.

EXAMPLE 4

Polybutadiene coated Alcoa Wilhelmy particles were not degraded by aqueous eluent at both low pH and high pH. An exceptional chemical stability of eluents was observed and appears as an effect of eluent pH on the selectivity of purines and pyrimidines. Depending upon the pKa of these compounds, mobile phase pH was adjusted to accelerate or retard the basic compounds relative to each other. The selectivities of 5-methylcytosine/adenine, uracil/adenine, and hypoxanthine/5-methylcytosine pairs were calculated and show a swing in selectivities primarily attributable to the drastic change in polarity of these bases at two extreme pHs. This phenomenon can be described as follows. At low value of eluent pH (in this case, pH=2), these bases are protonated and become electronically charged. While at elevated pH (in this case, pH=10), these bases are deprotonated and become electronically neutral. Under these conditions, a significant change in polarity of these bases is expected. The retention behavior will depend on overall polarity of these bases at two extreme pHs. Polarity data for these bases are not available, and a direct chromatographic correlation cannot be made. Nevertheless, control of retention and selectivity through pH manipulation provides additional means to improve the separations.

EXAMPLE 5

A reversed phase test mix and a mobile phase composition of 50 percent $MeOH$/50 percent $H_2O$ at a flow rate of 1 ml/min were evaluated. Chromatograms were obtained, and column efficiencies (plates/meter) were calculated from chromatograms for separations compounds listed in Table II.

TABLE II

| Compound | COMPARISON OF COLUMN EFFICIENCY AMONG VARIOUS REVERSED-PHASES | | | | | |
|---|---|---|---|---|---|---|
| | DuPont $C_{18}$ (Silica) (5 µm) | Alcoa $C_{18}$ (S-100) (Alumina) (10 µm) | Alcoa $C_{18}$ (Woehm) (Alumina) (5 µm) | 20% PBD on Partisil (Silica) (5 µm) | 20% PBD on A-10Y (Alumina) (10 µm) | 9% PBD on Alcoa Wilhelmy (Alumina) (9 µm) |
| theophilline | 10,735 | 4,403 | 4,717 | 4,399 | 14,875 | 20,589 |
| p-nitroaniline | 31,115 | 6,843 | 7,686 | 23,104 | 43,999 | 37,853 |
| methylbenzoate | 45,630 | 8,148 | 8,219 | 36,100 | 17,568 | 11,977 |
| phenetole | | | 6,907 | 40,701 | 30,759 | |

A direct comparison of plates/meter obtained among these columns was difficult because the particles differ in size. Taking particle size factor into consideration, the column efficiencies were compared in terms of the reduced plate height, which defines as $h = L/ND_p$, where h is the reduced plate height, L is the column length, and $D_p$ is the diameter of particle. For each of the columns, the reduced plate height for each solute was calculated and results are shown in the Table III.

TABLE III

| Compound | COMPARISON OF COLUMN EFFICIENCY OF VARIOUS REVERSED-PHASE PACKINGS AT REDUCED PLATE HEIGHT (Reduced Plate Height ($h = L/ND_p$)) | | | | | |
|---|---|---|---|---|---|---|
| | DuPont $C_{18}$ (5 µm) (25 cm) | Alcoa $C_{18}$ (S-100) (10 µm) (25 cm) | Alcoa $C_{18}$ (Woehm) (5 µm) (25 cm) | 20% PBD on Partisil (5 µm) (15 cm) | 20% PBD on Spherisorb (A-10Y) (10 µm) (15 cm) | 9% PBD on Alcoa Wilhelmy (8 µm) (15 cm) |
| theophilline | 18.63 | 22.71 | 43.39 | 45.46 | 6.72 | 6.07 |
| p-nitroaniline | 6.42 | 14.61 | 26.02 | 8.65 | 2.27 | 3.30 |
| methylbenzoate | 4.38 | 12.27 | 24.33 | 5.54 | 5.69 | 10.43 |
| phenetole | | 13.41 | 28.95 | 4.91 | 3.25 | |

As can be seen, both polybutadiene coated Alcoa Wilhelmy particles and Spherisorb (A-10) exhibit the best column efficiency (smallest reduced plate height) among the columns tested for theophilline and p-nitroaniline. However, DuPont $C_{18}$ shows the highest column efficiency for methylbenzoate. Since polybutadiene coated Alcoa Wilhelmy particles were performed under less than ideal conditions (much lower surface area compared to other media), much higher column efficiency should be obtainable when the surface area of particle is increased.

EXAMPLE 6

A mixture of benzene, toluene, naphthalene, and phenanthrene was separated on a 15 cm×4.6 mm, 20 percent polybutadiene (PBD) coated Alcoa Wilhelmy particles column. The mobile phase used for this separation was 50 percent $H_2O$/50 percent acetonitrile. These five aromatics were easily separated with good resolution under 7 minutes.

EXAMPLE 7

The separations of basic and nitrogen containing compounds were investigated using the PBD coated Alcoa Wilhelmy particles column and relatively simple mobile phase conditions. Five substituted anilines in a mobile phase of 70 percent $H_2O$/30 percent acetonitrile were passed through the column at a flow rate of 1 ml/min. The anilines were p-toluidine, n-methylaniline, 2,5-dimethylaniline, 4-chloroaniline, and 2-chloroaniline. Under these conditions, total analysis time was less than 6 minutes with baseline separation of all compounds except 4-chloroaniline and 2-chloroaniline.

EXAMPLE 8

Two purine and pyrimidine mixtures were separated in a 9 percent PBD coated Alcoa Wilhelmy particles column with a mobile phase composition of 0.01 M TRIS in $H_2O$ (pH=10). One mixture contained xanthine, adenine, uracil, thymine, and 5-methylcytosine. The second mixture contained guanine, adenine, uracil, thymine, and 5-methylcytosine. The column performance was superior to commercially available Hamilton PRP-1 resin column in analysis time and peak resolution.

EXAMPLE 9

Nucleosides were separated through a 9 percent PBD coated Alcoa Wilhelmy packing bed in a 25 cm×4.6 mm column. The mobile phase used was a 0.01 M sodium dihydrogen phosphate buffer with 0.05 M tetrabutylammonium phosphate as an ion-pairing agent. Nucleosides were paired with tetraammonium phosphate to form complexes (neutral molecules) in the reversed phase column. The mixed four nucleosides (uridine, cytidiene, guanosine, and adenosine) were resolved within 6 minutes.

EXAMPLE 10

Reversed phase separation of peptides on PBD coated Alcoa Wilhelmy particles was not as promising as the separation of others. A low surface area of Alcoa Wilhelmy particles in conjunction with high polarity of peptides is believed to reduce the capacity factors for peptides even at the weakest solvent strength (without adding any organic modifier). Nevertheless, some peptides were separated, including L-ala-L-tyr, L-phe-glyaylgly, and L-phe-gly.

While the invention has been described in terms of preferred embodiments, the claims appended hereto are intended to encompass all embodiments which fall within the spirit of the invention.

What is claimed is:

1. A process for separating a compound by liquid chromatography comprising:
   (a) introducing a liquid feed stream containing at least one compound into contact with a stable polybutadiene on an alumina/aluminum hydroxide comprised of generally spherical alumina/aluminum hydroxide support particles comprising crystals of alumina/aluminum hydroxide with the crystals extending radially outward from a central core region and having a shape selected from principally acicular to principally lamellar; and
   (b) separating said basic compound by liquid chromatography to form a purified product stream of said compound.

2. A process as set forth in claim 1 wherein said process comprises separating at least two compounds.

3. A process as set forth in claim 2 wherein said compounds are basic, nitrogen-containing compounds.

4. A process as set forth in claim 1 wherein said basic compound comprises aniline, n-methylaniline, or n,n-dimethylaniline.

5. A process as set forth in claim 1 wherein said basic compound comprises toluidine.

6. A process as set forth in claim 5 comprising a pH range of about 2-12.

7. A process as set forth in claim 1 comprising the separation of basic compounds useful as pharmaceuticals.

8. A process as set forth in claim 1 further comprising controlling pH within a specific range to modify separations selectivity.

9. A process as set forth in claim 1 comprising controlling pH within a specific range to modify retention time.

10. A process as set forth in claim 9 wherein said pH is controlled to be within the range of about 2-12.

11. A process as set forth in claim 1 further comprising incorporating an ion-suppression step.

12. A process as set forth in claim 11 wherein pH varies over the range about 2-12.

13. A process for separating a compound in a liquid chromatography column comprising:
    (a) introducing a liquid feed stream containing at least one basic, nitrogen-containing compound into a column containing a packing material of polybutadiene coated and crosslinked on an alumina comprised of generally spherical metal oxide/hydroxide support particles comprising crystals of metal oxide/hydroxide with the crystals extending radially outward from a central core region and having a shape selected from principally acicular to principally lamellar; and
    (b) separating said compound by liquid chromatography in said packed bed to form a purified product stream of said compound.

14. A process as set forth in claim 13 wherein said packed bed contains about 8-10% by weight polybutadiene.

15. A process as set forth in claim 13 wherein said basic compound comprises an aniline compound.

16. A process as set forth in claim 15 wherein said basic compound comprises n-methylaniline or n,n-dimethylaniline.

17. A process as set forth in claim 13 wherein said basic compound comprises toluidine.

18. A process for the separation of at least two basic, nitrogen-containing compounds in a liquid chromatography column comprising:
    (a) introducing a liquid feed stream containing at least one basic, nitrogen-containing compound into a column containing a packed bed of stable polybutadiene in a homogeneous, uniform film layer coated and crosslinked on an alumina of generally spherical metal oxide/hydroxide support particles comprising crystals of metal oxide/hydroxide with the crystals extending radially outward from a central core region and having a shape selected from principally acicular to principally lamellar; and
    (b) separating said basic compound by reverse phase liquid chromatography in said packed bed to form a purified product stream of said basic compounds.

* * * * *